United States Patent
Taguchi et al.

(10) Patent No.: US 10,774,649 B2
(45) Date of Patent: Sep. 15, 2020

(54) GAS TURBINE ROTOR AND GAS TURBINE GENERATOR

(71) Applicant: Panasonic Intellectual Property Management Co., Ltd., Osaka (JP)

(72) Inventors: Hidetoshi Taguchi, Osaka (JP); Masaya Honma, Hyogo (JP); Osao Kido, Kyoto (JP); Yoshitsugu Nishiyama, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/032,093

(22) Filed: Jul. 11, 2018

(65) Prior Publication Data
US 2019/0024511 A1 Jan. 24, 2019

(30) Foreign Application Priority Data
Jul. 18, 2017 (JP) .................. 2017-139012

(51) Int. Cl.
| | |
|---|---|
| *F01D 5/02* | (2006.01) |
| *F02C 3/04* | (2006.01) |
| *F02C 6/00* | (2006.01) |
| *F02C 7/06* | (2006.01) |
| *H02K 7/18* | (2006.01) |

(52) U.S. Cl.
CPC .............. *F01D 5/026* (2013.01); *F02C 3/04* (2013.01); *F02C 6/00* (2013.01); *F02C 7/06* (2013.01); *H02K 7/1823* (2013.01); *F05D 2220/32* (2013.01); *F05D 2220/76* (2013.01); *F05D 2240/20* (2013.01); *F05D 2240/50* (2013.01); *F05D 2240/60* (2013.01); *F05D 2250/82* (2013.01); *F05D 2260/52* (2013.01)

(58) Field of Classification Search
CPC ............. F05D 2220/32; F05D 2220/76; F05D 2240/20; F05D 2240/50; F05D 2240/60; F05D 2260/52; F02C 3/04; F02C 6/00; F02C 7/06; H02K 7/1823; F01D 5/026
USPC .................................................. 290/4 A, 52
See application file for complete search history.

(56) References Cited

U.S. PATENT DOCUMENTS

| | | | | |
|---|---|---|---|---|
| 2,516,066 | A | * 7/1950 | McLeod | F01D 5/026 464/162 |
| 2,723,528 | A | * 11/1955 | Stark | F02K 9/38 290/2 |
| 4,649,307 | A | * 3/1987 | Bech | H02K 49/00 310/83 |
| 4,667,123 | A | * 5/1987 | Denk | H02K 1/2753 310/156.11 |
| 5,697,848 | A | 12/1997 | Bosley | |

(Continued)

FOREIGN PATENT DOCUMENTS

JP 8-334117 12/1996

*Primary Examiner* — Charles Reid, Jr.
(74) *Attorney, Agent, or Firm* — McDermott Will & Emery LLP

(57) ABSTRACT

A gas turbine rotor includes a first rotor and a second rotor. The first rotor includes a compressor impeller, a turbine wheel, and a shaft. The turbine wheel has a common rotational axis with the compressor impeller. The shaft connects the compressor impeller to the turbine wheel. The second rotor is an electric generator rotor and defines an inner hollow space. The shaft includes an insertable portion disposed in the inner hollow space of the second rotor.

7 Claims, 7 Drawing Sheets

(56) References Cited

U.S. PATENT DOCUMENTS

| | | | | |
|---|---|---|---|---|
| 5,932,940 | A * | 8/1999 | Epstein | F01D 5/28 |
| | | | | 310/40 MM |
| 6,093,975 | A * | 7/2000 | Peticolas | F02C 9/56 |
| | | | | 290/40 A |
| 6,307,278 | B1 * | 10/2001 | Nims | F01D 15/10 |
| | | | | 290/52 |
| 2002/0079760 | A1 * | 6/2002 | Vessa | H02K 7/00 |
| | | | | 310/75 D |
| 2009/0160282 | A1 * | 6/2009 | Hayasaka | H02K 1/278 |
| | | | | 310/156.28 |
| 2014/0319843 | A1 * | 10/2014 | Perry | F02C 3/00 |
| | | | | 290/1 B |
| 2015/0078905 | A1 * | 3/2015 | Albuzat | B23K 1/0018 |
| | | | | 416/213 R |
| 2015/0285146 | A1 * | 10/2015 | Saari | F01D 25/125 |
| | | | | 60/806 |

\* cited by examiner

GAS TURBINE ROTOR AND GAS TURBINE GENERATOR

BACKGROUND

1. Technical Field

The present disclosure relates to a gas turbine rotor and a gas turbine generator.

2. Description of the Related Art

Various studies have been conducted on gas turbine generators. Japanese Unexamined Patent Application Publication No. 8-334117 (Patent Literature 1) describes a permanent magnet turbogenerator 210, illustrated in FIG. 6. The permanent magnet turbogenerator 210 is an example of a gas turbine generator.

The permanent magnet turbogenerator 210 includes a compressor impeller 232 and a turbine wheel 233. With reference to FIG. 7, the hubs of the compressor impeller 232 and the turbine wheel 233 and a bearing rotor 236 collectively form a power head shaft 235. The bearing rotor 236 is rotatably supported by a journal bearing 238.

The permanent magnet turbogenerator 210 further includes a permanent magnet sleeve 216 and a permanent magnet 217. The permanent magnet sleeve 216 and the permanent magnet 217 collectively form a permanent magnet shaft 228.

The power head shaft 235 is held on a tie rod 243 of a flexible disk shaft 240. The permanent magnet shaft 228 fits in a cup-shaped flexible disk member 247 of the flexible disk shaft 240. The power head shaft 235, the flexible disk shaft 240, and the permanent magnet shaft 228 are thus combined with one another.

SUMMARY

The techniques described in Patent Literature 1 are not suitable for reducing the size of a gas turbine generator. One non-limiting and exemplary embodiment of the disclosure provides techniques suitable for providing a small gas turbine generator.

In one general aspect, the techniques disclosed here feature a gas turbine rotor including: a first rotor that includes a compressor impeller, a turbine wheel having a common rotational axis with the compressor impeller, and a shaft connecting the compressor impeller to the turbine wheel; and a second rotor that is an electric generator rotor and defines an inner hollow space, wherein the shaft includes an insertable portion disposed in the inner hollow space of the second rotor.

The techniques disclosed here are appropriate for reducing the length of a gas turbine rotor and can thus enable a small gas turbine generator to be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
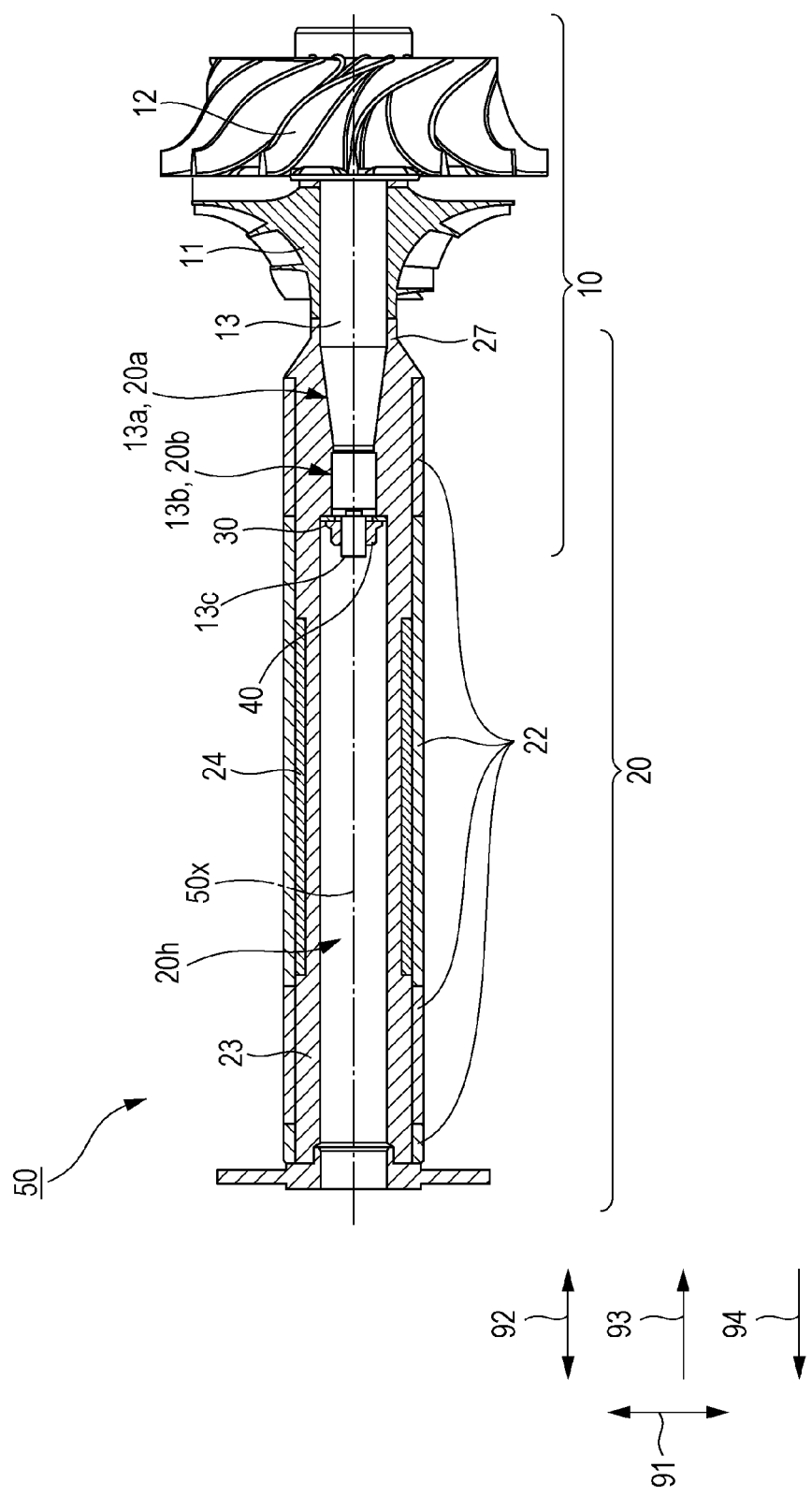
FIG. 1 illustrates a configuration of a gas turbine rotor according to an embodiment.

DETAILED DESCRIPTION (Underlying Knowledge Forming Basis of Present Disclosure)

In the permanent magnet turbogenerator 210 in Patent Literature 1, the power head shaft 235, the flexible disk shaft 240, and the permanent magnet shaft 228 are combined with one another. This combined shaft may be hereinafter referred to as "compound shaft". The power head shaft 235 functions as a rotor adjacent to the gas generator. The permanent magnet shaft 228 functions as a rotor adjacent to the electric generator. The flexible disk shaft 240 functions as a shaft coupling. Studies of the present inventors have revealed that the flexibility of the flexible disk shaft 240 can extend the range of possible rotational frequency of the compound shaft and extend the operating range of the permanent magnet turbogenerator 210.

Specifically, this flexibility increases the natural flexural resonance frequency of the compound shaft and increases the upper limit of possible rotational frequency of the compound shaft. The natural flexural resonance frequency is called, for example, a flexural critical resonant frequency or flexural critical speed in Patent Literature 1. The natural flexural resonance frequency may also be called a flexural resonance frequency.

More specifically, the flexible disk member 247 of the flexible disk shaft 240 includes a flexible disk 246. Patent Literature 1 describes that the flexible disk may have a tapered thickness. This tapered thickness enables the flexible disk to function as a diaphragm. This function increases the natural flexural resonance frequency of the compound shaft.

The bearing rotor 236 of the power head shaft 235 is supported by the journal bearing 238. Patent Literature 1 describes that the journal bearing 238 is an air bearing. The air bearing can support a rotor with low friction losses.

Undesirably, the air bearing can less readily reduce the vibration of the compound shaft even if the rotational frequency of the compound shaft deviates from the natural flexural resonance frequency, compared with an oil retaining bearing. This phenomenon occurs because attenuation of vibration by air is not as effective as attenuation of vibration by oil. The vibration destabilizes the rotation of the compound shaft, resulting in unstable operation of the gas turbine generator. To solve this problem, the air bearing requires a larger margin between the rotational frequency and the natural flexural resonance frequency than that of the oil retaining bearing. As described above, the flexible disk shaft 240 can increase the natural flexural resonance frequency. That is, the flexible disk shaft 240 facilitates application of the air bearing.

Conversely, the journal bearing 238 enables application of the flexible disk shaft 240. Specifically, the journal bearing 238 can prevent the flexible disk shaft 240 and the power head shaft 235 from sagging due to the flexibility of the flexible disk shaft 240.

The journal bearing 238, however, unintentionally increases the length of the power head shaft 235. Such an elongated power head shaft 235 tends to increase the length of the compound shaft. That is, application of the journal bearing 238 is disadvantageous for reducing the size of the gas turbine generator.

A typical example of a gas turbine generator is a micro gas turbine. The micro gas turbine is a low-output gas turbine generator. The output of the micro gas turbine is, for example, lower than 100 kW. In a typical micro gas turbine, a rotor adjacent to the gas generator is connected directly to a rotor adjacent to the electric generator with a shaft coupling without a reduction gear or other component. The connected rotors are then driven at the same rotational frequency. This configuration can reduce the overall size of the micro gas turbine to some extent.

Recent demand has focused on a reduction in the overall size of micro gas turbines mainly for the purpose of improving merchantability. An air bearing is more advantageous than an oil retaining bearing for reducing overall size, because an oil retaining bearing tends to be accompanied by large lubricating accessories. An air bearing, however, requires a larger margin between the rotational frequency and the natural flexural resonance frequency to reduce vibration.

The inventors performed investigations to reduce vibration for stable operation of the micro gas turbine having a small overall size and to efficiently operate the micro gas turbine. On one hand, the rotor should have a low rotational frequency to increase the above-mentioned margin in terms of reducing vibration. On the other hand, the gas turbine generator generating less electricity tends to have a higher rotational frequency in highly efficient operation. That is, the rotor should have a high rotational frequency in terms of improving the efficiency of the micro gas turbine. As described above, the micro gas turbine has these contradictory requirements regarding rotational frequency. In view of the requirement for efficiency, the margin is preferably ensured by not decreasing the rotational frequency but increasing the natural flexural resonance frequency to achieve a balance between the stability and efficiency of operation of the micro gas turbine.

The flexible disk shaft 240 in Patent Literature 1 can increase the natural flexural resonance frequency. This flexible disk shaft 240, however, requires the journal bearing 238 to prevent the flexible disk shaft 240 from sagging. This journal bearing 238 is preferably excluded to reduce the size of the micro gas turbine. Since the absence of the journal bearing 238 causes sagging of the flexible disk shaft 240, the flexible disk shaft 240 is also preferably excluded, in addition to the journal bearing 238. In this case, a device other than the flexible disk shaft 240 is required to ensure a high natural flexural resonance frequency.

The inventors have devised a connecting structure between the rotor adjacent to the gas generator and the rotor adjacent to the electric generator to ensure a high natural flexural resonance frequency without a bearing that supports the rotor adjacent to the gas generator.

A gas turbine rotor according to a first aspect of the disclosure, includes a first rotor that includes a compressor impeller, a turbine wheel having a common rotational axis with the compressor impeller, and a shaft connecting the compressor impeller to the turbine wheel, and a second rotor that is an electric generator rotor and defines an inner hollow space.

The shaft includes an insertable portion disposed in the inner hollow space of the second rotor.

According to the first aspect, the first rotor does not require a bearing that supports the first rotor, such that the length of the first rotor can be readily reduced. In addition, the inserted structure according to the first aspect can substitute for a shaft coupling that connects the first rotor to the second rotor. The first aspect is therefore appropriate for reducing the length of the gas turbine rotor. The size of a gas turbine generator including the gas turbine rotor according to the first aspect can be reduced.

Furthermore, this short gas turbine rotor according to the first aspect can ensure a high natural flexural resonance frequency of the gas turbine rotor.

In a gas turbine rotor according to a second aspect of the disclosure based on the first aspect, the shaft has a tapered surface having a distance from the common rotational axis increasing in a first direction of axial directions indicating directions in which the common rotational axis extends, the second rotor has a funnel surface that is exposed to the inner hollow space and that has a distance from the common rotational axis increasing in the first direction of the axial directions, and the tapered surface fits the funnel surface.

The configuration according to the second aspect can enable highly accurate alignment of the central axis of the first rotor with the central axis of the second rotor without a bearing that supports the first rotor. The configuration can also suppress backlash between the first and second rotors during their rotation without a bearing that supports the first rotor. These features are advantageous for reducing the vibration and noise of the gas turbine rotor.

A gas turbine rotor according to a third aspect of the disclosure based on the first or second aspect, further includes a nut and a washer.

The washer has a spring structure elastically deformable in axial directions indicating directions in which the common rotational axis extends, the second rotor has a support surface that is exposed to the inner hollow space and that extends in directions intersecting the axial directions, the shaft includes a screw and a screw hole, the screw is threaded through the nut and the washer in sequence and into the screw hole in a first direction of the axial directions, and the washer is supported by the support surface and contracted in the axial directions to urge the nut in a second direction of the axial directions.

The washer according to the third aspect can readily retain the first rotor at an appropriate position in the axial directions.

The first rotor and/or the second rotor may extend in the axial directions due to thermal expansion, for example. The washer according to the third aspect, however, urges the nut and can thus suppress the nut from loosening due to such extension of the first rotor and/or the second rotor. The washer can therefore stabilize the rotation of the gas turbine rotor. A gas turbine generator including this gas turbine rotor can readily perform stable operation.

In a gas turbine rotor according to a fourth aspect of the disclosure based on any one of the first to third aspects, the second rotor includes a sleeve surrounding the inner hollow space and an outer cylinder surrounding the sleeve, the sleeve includes a protruding portion protruding from the outer cylinder, and the protruding portion is in contact with the compressor impeller.

The protruding portion of the sleeve according to the fourth aspect is in contact with the compressor impeller. This structure can facilitate alignment of the compressor impeller to an appropriate position. The alignment does not require another member, such as a screw or coupling. This feature is advantageous for reducing the length of the gas turbine rotor.

In a gas turbine rotor according to a fifth aspect of the disclosure based on any one of the first to fourth aspects, the compressor impeller and the turbine wheel define a first gap therebetween, the first gap has a distal end in radial directions that are perpendicular to axial directions which indicate directions in which the common rotational axis extends, and the distal end has a length in the axial directions equal to or shorter than 25% the diameter of the compressor impeller.

Since the first gap according to the fifth aspect is sufficiently small, the length of the gas turbine generator can be readily reduced.

A gas turbine generator according to a sixth aspect of the disclosure, includes the gas turbine rotor according to any one of the first to fifth aspects and one or more bearings that support the second rotor in radial directions that are perpendicular to axial directions which indicate directions in which the common rotational axis extends.

The configuration according to the sixth aspect enables effects equal to those of the first aspect to be obtained.

In a gas turbine generator according to a seventh aspect of the disclosure based on the sixth aspect, the compressor impeller and the turbine wheel define a first gap therebetween, the first gap has a distal end in the radial directions, the one or more bearings include a standard bearing having a shortest length in the axial directions among the one or more bearings, and the distal end has a length in the axial directions shorter than the length of the standard bearing in the axial directions.

Since the first gap according to the seventh aspect is sufficiently small, the size of the gas turbine generator can be readily reduced.

Embodiments of the disclosure will be described with reference to the accompanying drawings. These embodiments should not be construed as limiting the disclosure.

A gas turbine rotor 50, illustrated in FIG. 1, may be used as a rotor in a gas turbine generator. The gas turbine rotor 50 includes a first rotor 10 and a second rotor 20. These rotors 10 and 20 are connected to each other. The gas turbine rotor 50 further includes a nut 40 and a washer 30.

The first rotor 10 is disposed adjacent to the gas generator. The first rotor 10 is also called a gas generator rotor. The first rotor 10 includes a compressor impeller 11, a turbine wheel 12, and a shaft 13. The compressor impeller 11 is an impeller of a centrifugal compressor and is also called a centrifugal compressor impeller. The turbine wheel 12 is a wheel of a radial turbine and is also called a radial turbine wheel. Each of the compressor impeller 11 and the turbine wheel 12 has blades. The compressor impeller 11 and the turbine wheel 12 have a common rotational axis 50x. The shaft 13 connects the compressor impeller 11 to the turbine wheel 12.

The directions in which the common rotational axis 50x extends may be hereinafter referred to as "axial directions 92". One of the axial directions 92 may be referred to as "first direction 93". The other of the axial directions 92 may be referred to as "second direction 94". The directions perpendicular to the axial directions 92 may be referred to as "radial directions 91".

The compressor impeller 11 compresses working fluid. The turbine wheel 12 expands the compressed working fluid and receives torque from the working fluid. The shaft 13 transfers this torque to the compressor impeller 11.

The shaft 13 is also called a gas generator shaft. In this embodiment, the shaft 13 is a single member and composed of a single material. The turbine wheel 12 has an integral structure with the shaft 13. The turbine wheel 12 and the shaft 13 are composed of the same material. The shaft 13 extends from the side of the turbine wheel 12 opposite to the compressor impeller 11. The shaft 13 extends through a hub opening of the compressor impeller 11.

Figure 2:
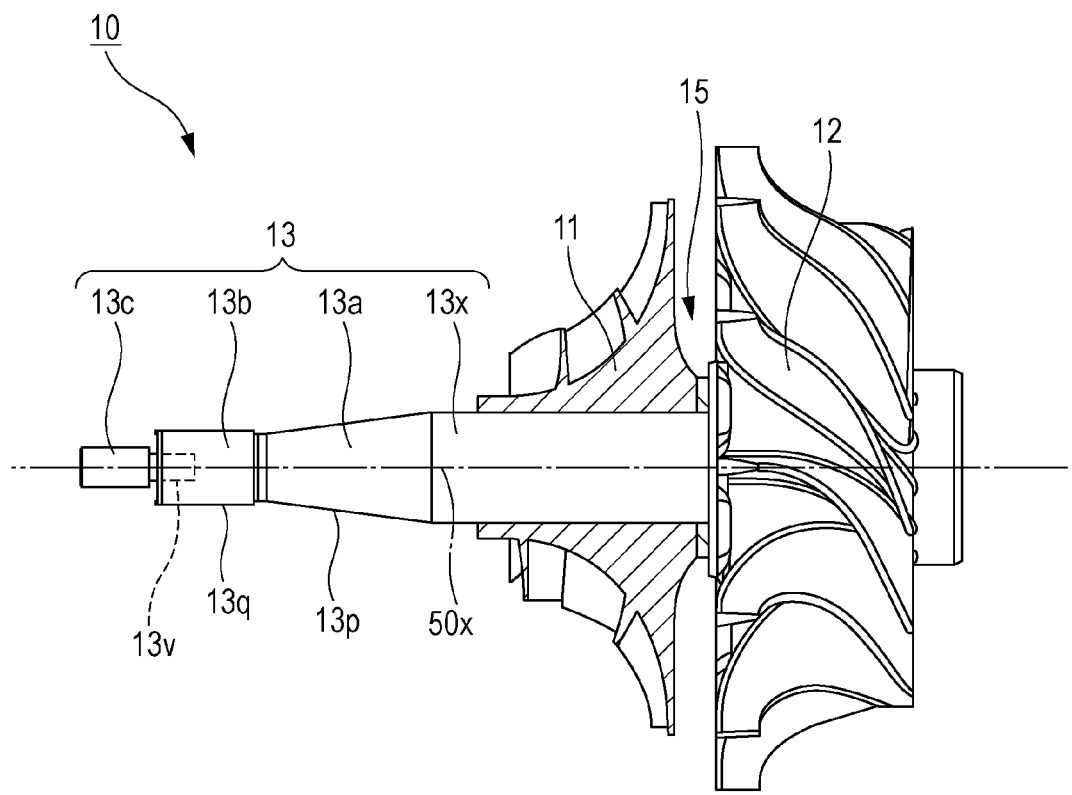
FIG. 2 illustrates a configuration of a first rotor according to the embodiment.
Figure 2:
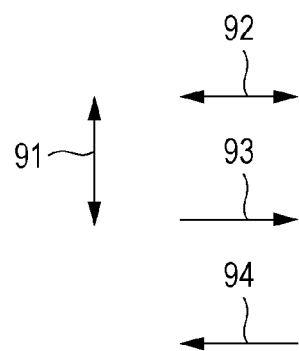

With reference to FIG. 2, the shaft 13 includes a straight portion 13b, a tapered portion 13a, and a base portion 13x in this embodiment. The straight portion 13b has a cylindrical shape. The straight portion 13b has a curved surface 13q. The curved surface 13q has a constant distance from the common rotational axis 50x. The tapered portion 13a has a tapered surface 13p. The tapered surface 13p has a distance from the common rotational axis 50x increasing in the first direction 93. The base portion 13x has a cylindrical shape having a larger diameter than of the straight portion 13b. In this embodiment, the shaft 13 further includes a screw 13c and a screw hole 13v. The tapered portion 13a may also be hereinafter referred to as "tapered shaft 13a".

The second rotor 20 rotates with the first rotor 10. In this embodiment, the second rotor 20 also rotates about the common rotational axis 50x. The second rotor 20 rotates and generates electricity in cooperation with a stator of the gas turbine generator.

The second rotor 20 is an electric generator rotor. The second rotor 20 defines an inner hollow space 20h. In this embodiment, the second rotor 20 has a hollow cylindrical shape.

Figure 4:
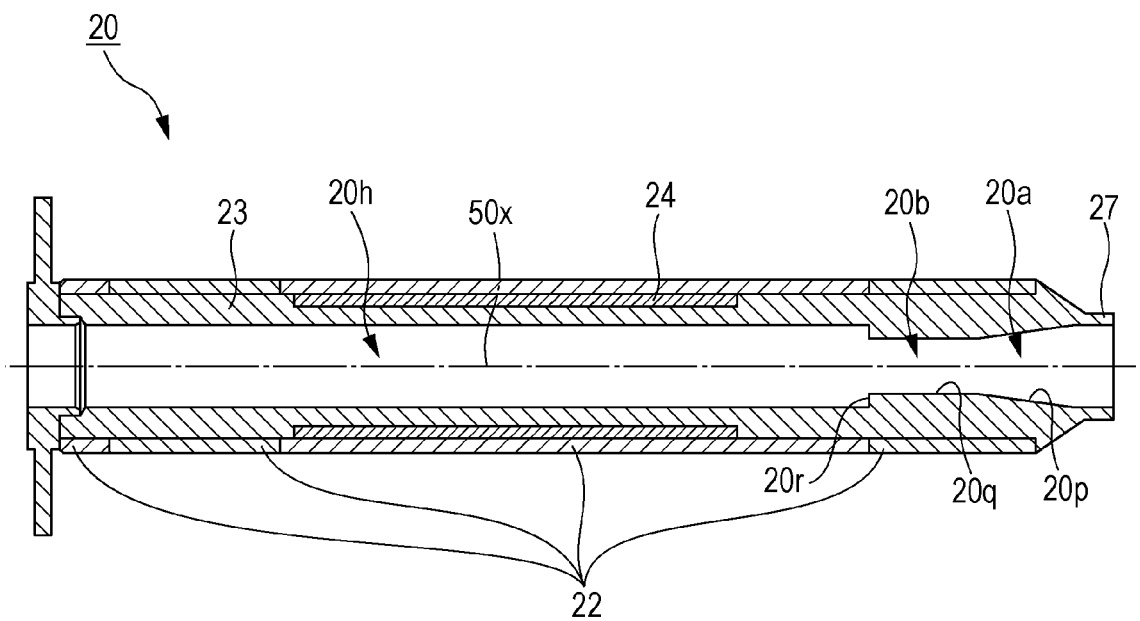
FIG. 4 illustrates a configuration of a second rotor according to the embodiment.
Figure 4:
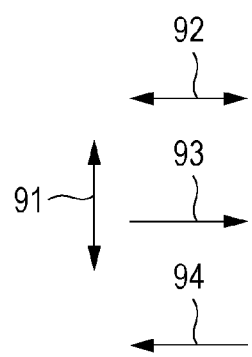

With reference to FIG. 4, the second rotor 20 has a straight curved surface 20q, a funnel surface 20p, and a support surface 20r in this embodiment. The surfaces 20q, 20p, and 20r are exposed to the inner hollow space 20h. The inner hollow space 20h includes a straight space 20b and a tapered space 20a. The curved surface 20q has a constant distance from the common rotational axis 50x. The curved surface 20q defines the straight space 20b therein. The funnel surface 20p has a distance from the common rotational axis 50x increasing in the first direction 93. The funnel surface 20p defines the tapered space 20a therein. The support surface 20r extends in directions intersecting the axial directions 92. Specifically, the support surface 20r extends in the radial directions 91.

In this embodiment, the second rotor 20 is an electric generator rotor of a surface permanent magnet type. The second rotor 20 includes a sleeve 23, an outer cylinder 22, and a permanent magnet 24. The outer cylinder 22 surrounds the sleeve 23. The sleeve 23 surrounds the inner hollow space 20h. The permanent magnet 24 is fixed by the sleeve 23. Specifically, the permanent magnet 24 is embedded in the sleeve 23. Although the outer cylinder 22 is composed of two or more portions in this embodiment, the outer cylinder 22 may also be composed of a single member.

In this embodiment, the sleeve 23 has the above-described curved surface 20q, funnel surface 20p, and support surface 20r.

Referring back to FIG. 1, the washer 30 has a spring structure elastically deformable in the axial directions 92. The washer 30 is a spring lock washer, for example, standardized in Japanese Industrial Standard (JIS) B 1251:2001. The nut 40 is specifically an end nut.

The shaft 13 includes an insertable portion inserted into the inner hollow space 20h of the second rotor 20. Specifically, while the tapered surface 13p fits the funnel surface 20p, the curved surface 13q and the curved surface 20q extend along each other. The screw 13c is screwed into the screw hole 13v through the nut 40 and the washer 30. The washer 30 urges the nut 40 in the second direction 94 while being supported by the support surface 20r. The first rotor 10 and the second rotor 20 are thus connected to each other.

As described above, the insertable portion of the shaft 13 is inserted into the inner hollow space 20h of the second rotor 20. This inserted structure can provide various advantages.

Specifically, the inserted structure can tighten the connection between the first rotor 10 and the second rotor 20. Sagging of the first rotor 10 is thus suppressed without a bearing that supports the first rotor 10. The bearing can thus be dispensed with. The absence of the bearing can reduce the length of the first rotor 10. In addition, the inserted structure can substitute for a shaft coupling that connects the first rotor 10 to the second rotor 20. The inserted structure can thus reduce the length of the gas turbine rotor 50. The size of a gas turbine generator including this gas turbine rotor 50 can be reduced.

This short gas turbine rotor 50 can ensure a high natural flexural resonance frequency and increase the upper limit of the rotational frequency of the gas turbine rotor 50. A gas turbine generator including this gas turbine rotor 50 can achieve a wide operating range.

The increase in the upper limit of the rotational frequency of the gas turbine rotor 50 is advantageous from various viewpoints. For example, the increase in this upper limit can reduce the diameter of the compressor impeller 11 and the diameter of the turbine wheel 12 and thus improve the efficiency of these aerodynamic components.

The absence of a shaft coupling and a bearing that supports the first rotor 10 can reduce the costs for fabricating a gas turbine generator including the gas turbine rotor 50.

In general, bearings are relatively fragile, although the fragility varies according to, for example, the specification or service condition of the gas turbine generator. The absence of a bearing can therefore improve the reliability of the gas turbine generator.

As described above, the shaft 13 has the tapered surface 13p having a distance from the common rotational axis 50x increasing in a first direction of the axial directions 92 in this embodiment. The second rotor 20 has the funnel surface 20p exposed to the inner hollow space 20h and having a distance from the common rotational axis 50x increasing in the first direction of the axial directions 92. The tapered surface 13p fits in the funnel surface 20p.

In the case where the outer surface of a cylindrical portion of a rotor fits the inner surface of a hollow cylindrical portion of another rotor, in order to reduce backlash between the rotors during their rotation without a bearing that supports one of the rotors, the central axes of the rotors are preferably aligned with each other with high accuracy without the bearing. Specifically, such a reduction in backlash requires highly accurate processing on the above-mentioned outer and inner surfaces and highly accurate fitting of these surfaces with each other. The highly accurate fitting of the surfaces leads to a small gap between the surfaces. In contrast, in this embodiment, the tapered surface 13p of the first rotor 10 fits the funnel surface 20p of the second rotor 20. In order to reduce backlash between the rotors 10 and 20 during their rotation without a bearing that supports the first rotor 10, the tapered surface 13p and the funnel surface 20p are preferably processed with high accuracy, as in the above case. The highly accurate fitting of the surfaces 13p and 20p with each other is, however, not essential in this embodiment. That is, the highly accurate alignment of the central axis of the first rotor 10 with the central axis of the second rotor 20 is relatively easy without a bearing that supports the first rotor 10 in this embodiment. In addition, the configuration in this embodiment can relatively readily reduce backlash between the rotors 10 and 20 during their rotation without a bearing that supports the first rotor 10. The configuration can thus reduce vibration and noise.

In some gas turbine rotors according to the related art including a shaft coupling, the shaft coupling has a complex surface structure provided by, for example, key cutting and spline cutting. For such a shaft coupling, a portion of the gas turbine rotor that fits with the shaft coupling is required to also have a complex surface structure. In contrast, in this embodiment, the tapered surface 13p fits the funnel surface 20p for transferring torque, without a complex surface structure of the gas turbine rotor 50. This embodiment has superiority because the rotors 10 and 20 are connected to each other with this simple mechanism.

The gas turbine rotor 50, in which the tapered surface 13p fits the funnel surface 20p, can be appropriately applied to, in particular, a turbomachine that ensures high output by increasing not the torque but the angular velocity.

The shaft 13 includes a mounted portion on which the compressor impeller 11 is mounted and a fitting portion that fits in the second rotor 20. The ratio of the diameter of the fitting portion to the diameter of the mounted portion is, for example, 0.4 or higher (specifically, 0.4 to 1.0). Since this ratio is sufficiently high, the configuration can readily suppress the situation where the rotational frequency of the gas turbine rotor 50 is limited to being low due to a natural flexural resonance frequency of the first rotor 10 being reduced by an excessively thin fitting portion. Specifically, the fitting portion corresponds to the tapered shaft 13a. The ratio of the diameter of the tapered shaft 13a to the diameter of the mounted portion is variable within the range of 0.4 or higher (more specifically, 0.4 to 1.0).

The ratio of the length of the insertable portion of the shaft 13 inserted into the inner hollow space 20h in the axial directions 92 to the entire length of the shaft 13 in the axial directions 92 is, for example, 0.6 or lower (specifically, 0.2 to 0.6). Since this ratio is sufficiently low, the configuration can readily suppress the situation where the rotational frequency of the gas turbine rotor 50 is limited to being low due to a natural flexural resonance frequency of the first rotor 10 being reduced by an excessively long insertable portion.

As described above, the gas turbine rotor 50 includes the nut 40 and the washer 30 in this embodiment. The washer 30 has a spring structure elastically deformable in the axial directions 92. The second rotor 20 has the support surface 20r exposed to the inner hollow space 20h and extending in the directions intersecting the axial directions 92. The shaft 13 includes the screw 13c and the screw hole 13v. The screw 13c is threaded through the nut 40 and the washer 30 in the order mentioned and into the screw hole 13v in the first direction of the axial directions 92. The washer 30 is supported by the support surface 20r. The washer 30 is contracted in the axial directions 92 and urges the nut 40 in the second direction of the axial directions 92.

The washer 30 can tightly fasten the screw 13c. The washer 30 can thus retain the first rotor 10 at an appropriate position in the axial directions 92 without a bearing that supports the first rotor 10.

The first rotor 10 and/or the second rotor 20 may extend or contract in the axial directions 92 due to thermal expansion or contraction, for example. The washer 30, however, urges the nut 40 and can prevent the nut 40 from loosening due to such extension or contraction. The washer 30 can thus stabilize the rotation of the gas turbine rotor 50. A gas turbine generator including this gas turbine rotor 50 can therefore perform stable operation.

The urging force from the washer 30 to the nut 40 can maintain the contact between the tapered surface 13p and the funnel surface 20p regardless of extension or contraction of the first rotor 10 and/or the second rotor 20. This configuration can suppress deviation of the central axes of the first rotor 10 and the second rotor 20 from each other and thus reduce the whirling vibration of the rotors 10 and 20.

In this embodiment, while the tapered shaft 13a fits in the tapered space 20a, the curved surface 13q and the curved surface 20q extend along each other. The straight portion 13b facilitates mounting of the washer 30 on the support surface 20r. This function is performed because the straight portion 13b is guided by the straight space 20b during insertion of the insertable portion of the shaft 13 into the inner hollow space 20h so that the central axes of the tapered shaft 13a and the tapered space 20a approach each other. It should be noted that the state where the tapered shaft 13a fits in the tapered space 20a corresponds to the state where the tapered surface 13p fits the funnel surface 20p.

In this embodiment, the second rotor 20 includes the sleeve 23 surrounding the inner hollow space 20h and the outer cylinder 22 surrounding the sleeve 23. The sleeve 23 includes a protruding portion 27 protruding from the outer cylinder 22. The protruding portion 27 is in contact with the compressor impeller 11. This structure can facilitate alignment of the compressor impeller 11 to an appropriate position. The alignment does not require another member, such as a screw or coupling. The length of the gas turbine rotor 50 can thus be readily reduced.

In this embodiment, the compressor impeller 11 and the turbine wheel 12 are mounted on the base portion 13x of the shaft 13. The insertable portion of the shaft 13 inserted into the inner hollow space 20h, the portion of the base portion 13x on which the compressor impeller 11 is mounted, and the portion of the base portion 13x on which the turbine wheel 12 is mounted are arranged in the axial directions 92 in the order mentioned. This arrangement can ensure sufficient distance between the second rotor 20 and the turbine wheel 12 that is readily subject to high temperature. The arrangement can thus avoid losing magnetism of the permanent magnet 24 of the second rotor 20 due to high temperature. The second rotor 20 is typically composed of an insulating material. The above-mentioned arrangement can also avoid losing insulating performance of the insulating material due to high temperature.

Figure 3:
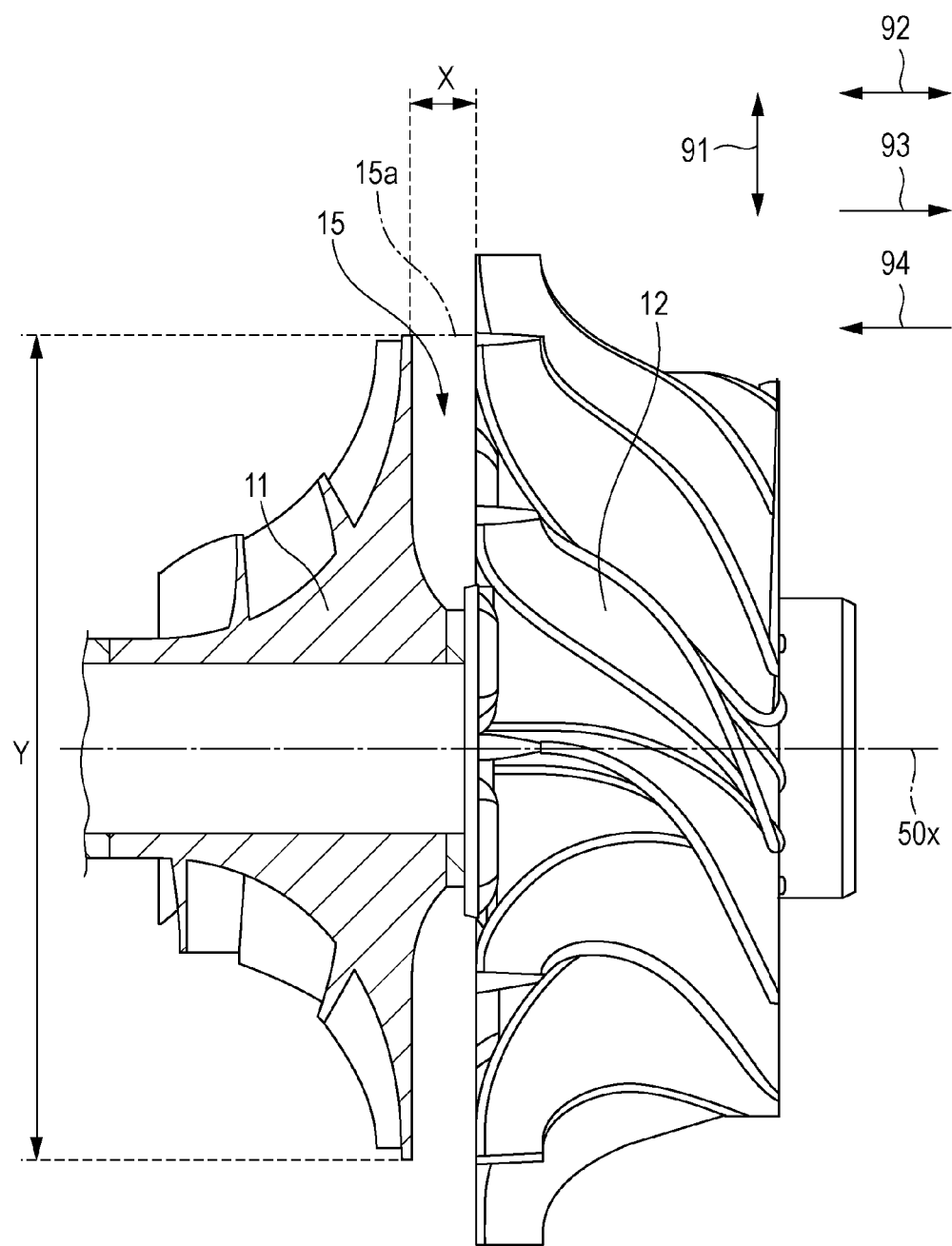
FIG. 3 is a partially enlarged view of the first rotor according to the embodiment.

With reference to FIG. 3, the compressor impeller 11 and the turbine wheel 12 define a first gap 15 therebetween in this embodiment. The first gap 15 has a distal end 15a in the radial directions 91. The distal end 15a has a length X in the axial directions 92 equal to or shorter than 25% of diameter Y of the compressor impeller 11. Since the first gap 15 is sufficiently small, the length of the gas turbine rotor 50 can be readily reduced. The length X is equal to or longer than 15% of diameter Y, for example.

Figure 5:
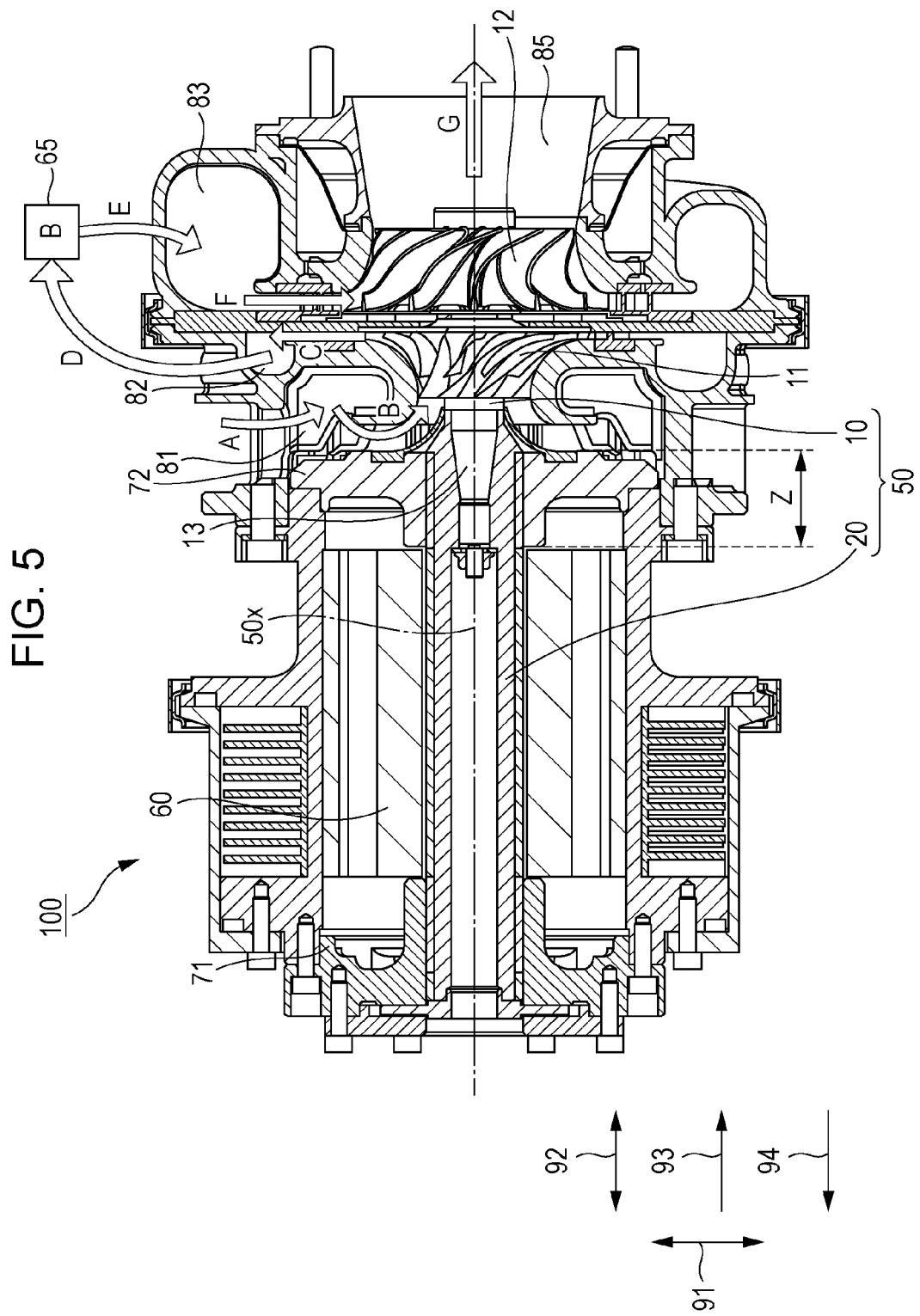
FIG. 5 illustrates a configuration of a gas turbine generator according to an embodiment.
Figure 6:
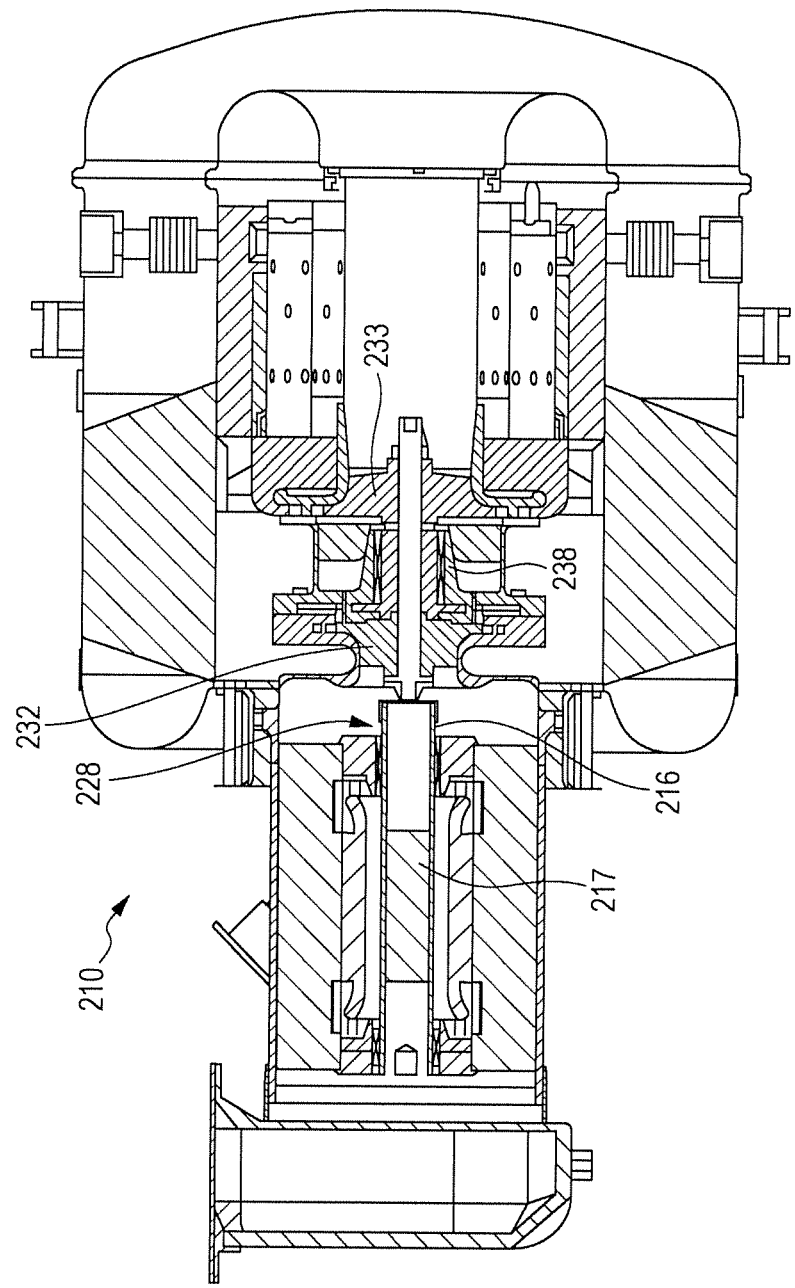
FIG. 6 is a diagram for describing a permanent magnet turbogenerator in Patent Literature 1.
Figure 7:
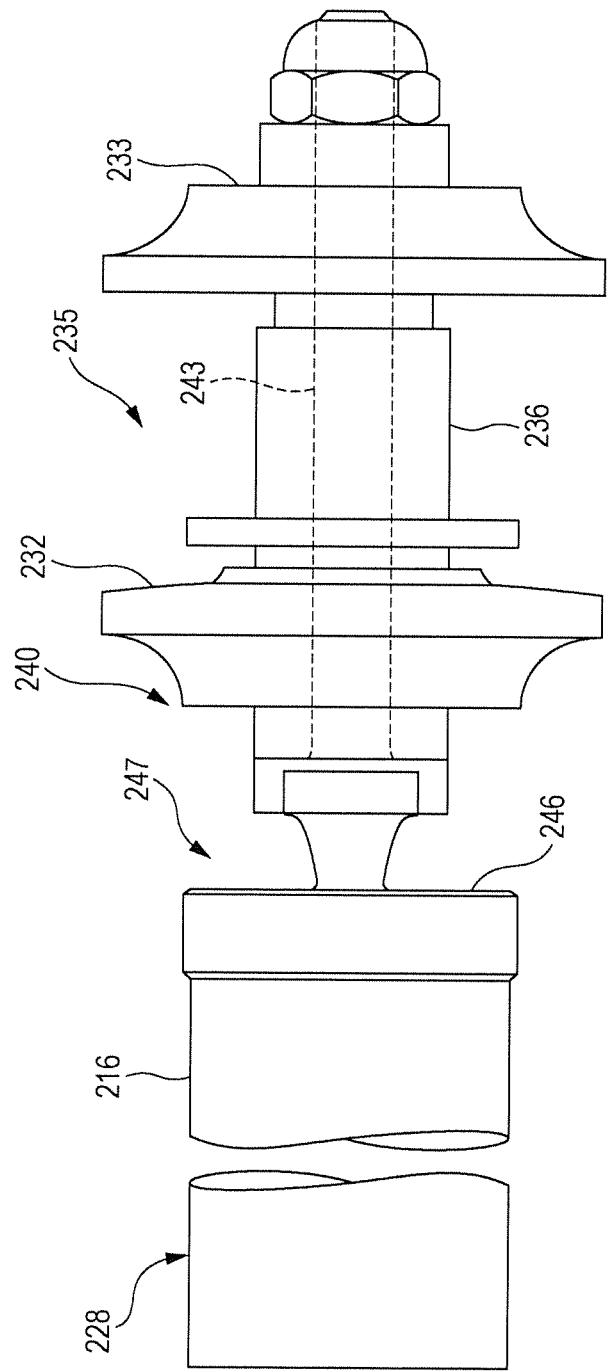
FIG. 7 is a diagram for describing the permanent magnet turbogenerator in Patent Literature 1.

FIG. 5 illustrates an exemplary gas turbine generator including the gas turbine rotor 50.

A gas turbine generator 100 illustrated in FIG. 5 includes the gas turbine rotor 50, a stator 60, and a combustor 65. The gas turbine generator 100 further includes a first bearing 71 and a second bearing 72. The gas turbine generator 100 further includes a first chamber 81, a second chamber 82, a third chamber 83, and a duct 85.

The second rotor 20 is supported by one or more bearings, specifically, multiple bearings, more specifically, the first bearing 71 and the second bearing 72.

The gas turbine generator 100 operates as explained below using a working fluid, such as air.

The working fluid enters the first chamber 81, as illustrated by arrow A. The working fluid then flows from the first chamber 81 into the compressor impeller 11, as illustrated by arrow B. The working fluid is compressed in the compressor impeller 11.

The working fluid then flows from the compressor impeller 11 into the second chamber 82, as illustrated by arrow C. Then the working fluid flows from the second chamber 82 into the combustor 65, as illustrated by arrow D. In the combustor 65, fuel is injected into the working fluid to form a fuel-air mixture. The fuel-air mixture is combusted into a combustion gas having a high temperature.

The resulting combustion gas flows from the combustor 65 into the third chamber 83, as illustrated by arrow E. The combustion gas then flows from the third chamber 83 into the turbine wheel 12, as illustrated by arrow F. The combustion gas rotates the turbine wheel 12. The expanded combustion gas in the turbine wheel 12 is discharged from the turbine wheel 12 through the duct 85, as illustrated by arrow G.

The rotation of the turbine wheel 12 rotates the compressor impeller 11. This mechanism can provide a force to drive the compressor impeller 11. The rotation of the turbine wheel 12 also rotates the second rotor 20. The second rotor 20 thus receives torque and generates electricity in cooperation with the stator 60.

As described above, the gas turbine generator 100 has a passage of working fluid composed of the first chamber 81, the compressor impeller 11, the second chamber 82, and the combustor 65 connected in the order mentioned. The gas turbine generator 100 also has a passage of combustion gas composed of the combustor 65, the third chamber 83, the turbine wheel 12, and the duct 85 connected in the order mentioned. The gas turbine generator 100 generates electricity by supplying working fluid or combustion gas through these passages.

In an exemplary modification, the gas turbine generator 100 further includes a regenerative heat exchanger. The regenerative heat exchanger in this modification includes a first portion and a second portion. The first portion constitutes a part of the passage of working fluid between the second chamber 82 and the combustor 65. The second portion constitutes a part of the passage of combustion gas on the side of the turbine wheel 12 opposite to the combustor 65, specifically, a part on the side of the duct 85 opposite to the combustor 65. The regenerative heat exchanger uses the heat of combustion gas discharged from the turbine wheel 12 to preheat working fluid. This preheating process can reduce the fuel consumption in the combustor 65.

In this embodiment, if the bearing having the shortest length in the axial directions 92 among the one or more bearings illustrated in FIG. 5 is defined as a standard bearing, the length X is shorter than a length Z of the standard bearing in the axial directions 92. In the example illustrated in FIG. 5, the standard bearing corresponds to the second bearing 72. Since the first gap 15 is sufficiently small, the size of the gas turbine generator 100 can be readily reduced.

The bearings 71 and 72 are air bearings in this embodiment. The size of the gas turbine generator 100 can thus be readily reduced.

The techniques disclosed here can reduce the length of a gas turbine generator in the axial directions and thus reduce the overall size of the gas turbine generator.

The techniques disclosed here can enable high-speed rotation of a gas turbine rotor and high-efficiency power generation of the gas turbine generator.

The gas turbine rotor according to the disclosure can be appropriately applied to a micro gas turbine having an output lower than 100 kW, for example.

The gas turbine generator according to the disclosure can be mounted on a vehicle, such as a microbus or truck.

What is claimed is:

1. A gas turbine rotor, comprising:
a first rotor that includes a compressor impeller, a turbine wheel having a common rotational axis with the compressor impeller, and a shaft connecting the compressor impeller to the turbine wheel; and
a second rotor that is an electric generator rotor and defines an inner hollow space, wherein
the second rotor has a receiving hole that is located at a side of the first rotor, the receiving hole communicating with the inner hollow space, and
the shaft has one end inserted into the receiving hole of the second rotor, while the shaft is not present throughout the inner hollow space and the inner hollow space remains hollow.

2. The gas turbine rotor according to claim 1, wherein
the shaft has a tapered surface having a distance from the common rotational axis increasing in a first direction of axial directions, the axial directions indicating directions in which the common rotational axis extends,
the receiving hole of the second rotor has a funnel surface, the funnel surface having a distance from the common rotational axis increasing in the first direction of the axial directions, and
the tapered surface fits the funnel surface.

3. The gas turbine rotor according to claim 1, further comprising:
a nut; and
a washer, wherein
the washer has a spring structure elastically deformable in axial directions, the axial directions indicating directions in which the common rotational axis extends,
the second rotor has a support surface between the receiving hole and the inner hollow space, the support surface extending in directions intersecting the axial directions,
the shaft further includes a screw and a screw hole, the screw hole being formed at the one end of the shaft,
the screw is threaded through the nut and the washer in sequence and into the screw hole in a first direction of the axial directions, only the screw of the shaft remaining in the receiving hole, and
the washer is supported by the support surface, the washer being contracted in the axial directions and urging the nut in a second direction of the axial directions.

4. The gas turbine rotor according to claim 1, wherein
the second rotor includes a sleeve surrounding the inner hollow space and the receiving hole, and an outer cylinder surrounding the sleeve,
the sleeve includes a protruding portion protruding from the outer cylinder, and
the protruding portion is in contact with the compressor impeller.

5. The gas turbine rotor according to claim 1, wherein
the compressor impeller and the turbine wheel define a first gap therebetween,
the first gap has a distal end in radial directions, the radial directions being perpendicular to axial directions, the axial directions indicating directions in which the common rotational axis extends, and
the distal end has a length in the axial directions equal to or shorter than 25% of a diameter of the compressor impeller.

6. A gas turbine generator, comprising:
the gas turbine rotor according to claim 1; and
one or more bearings that support the second rotor in radial directions, the radial directions being perpendicular to axial directions, the axial directions indicating directions in which the common rotational axis extends.

7. The gas turbine generator according to claim 6, wherein
the compressor impeller and the turbine wheel define a first gap therebetween,
the first gap has a distal end in the radial directions,
the one or more bearings include a standard bearing having a shortest length in the axial directions among the one or more bearings, and
the distal end has a length in the axial directions shorter than the length of the standard bearing in the axial directions.

* * * * *